July 29, 1969 C. E. OVER 3,457,950
SLUICE VALVES

Filed June 7, 1967 5 Sheets-Sheet 3

INVENTOR
CHARLES EDWARD OVER
BY
Woodhams, Blanchard & Flynn
ATTORNEYS

July 29, 1969  C. E. OVER  3,457,950
SLUICE VALVES

Filed June 7, 1967  5 Sheets-Sheet 4

INVENTOR
CHARLES EDWARD OVER
BY
Woodhams, Blanchard & Flynn
ATTORNEYS

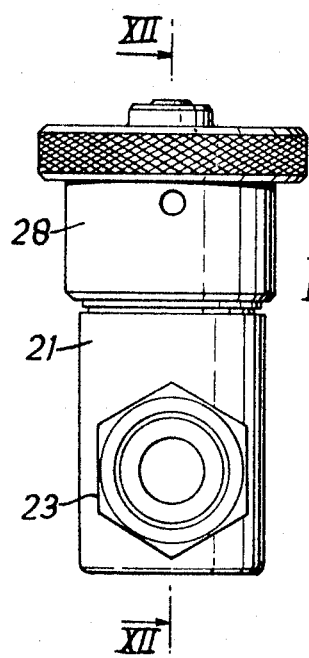
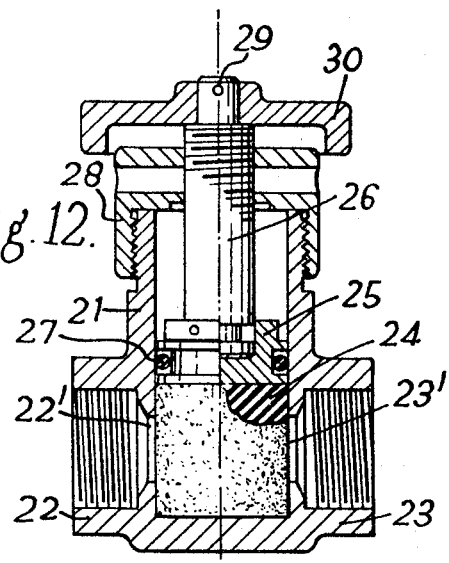
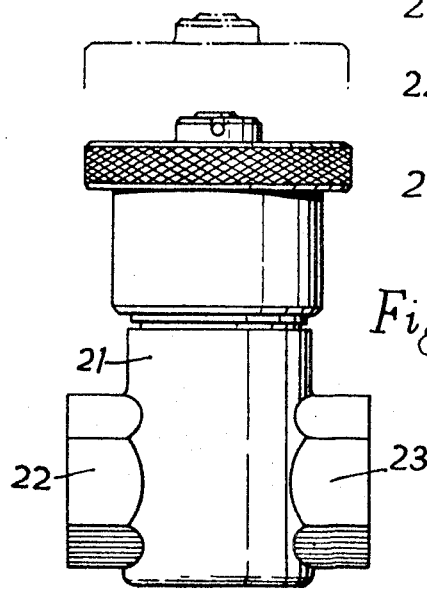

United States Patent Office 3,457,950
Patented July 29, 1969

3,457,950
SLUICE VALVES
Charles E. Over, Betchworth, England, assignor to Kinematics Limited, London, England
Filed June 7, 1967, Ser. No. 644,209
Claims priority, application Great Britain, June 8, 1966, 25,639/66
Int. Cl. F16k *3/00, 25/00*
U.S. Cl. 137—546          3 Claims

ABSTRACT OF THE DISCLOSURE

A sluice valve having a rubber block as a gate. The rubber block is movable against a stop into a position in which it extends across inlet and outlet openings in a metal valve body. Compression of the rubber block against the stop causes it to bulge out and seal against the openings.

---

Figure 1:
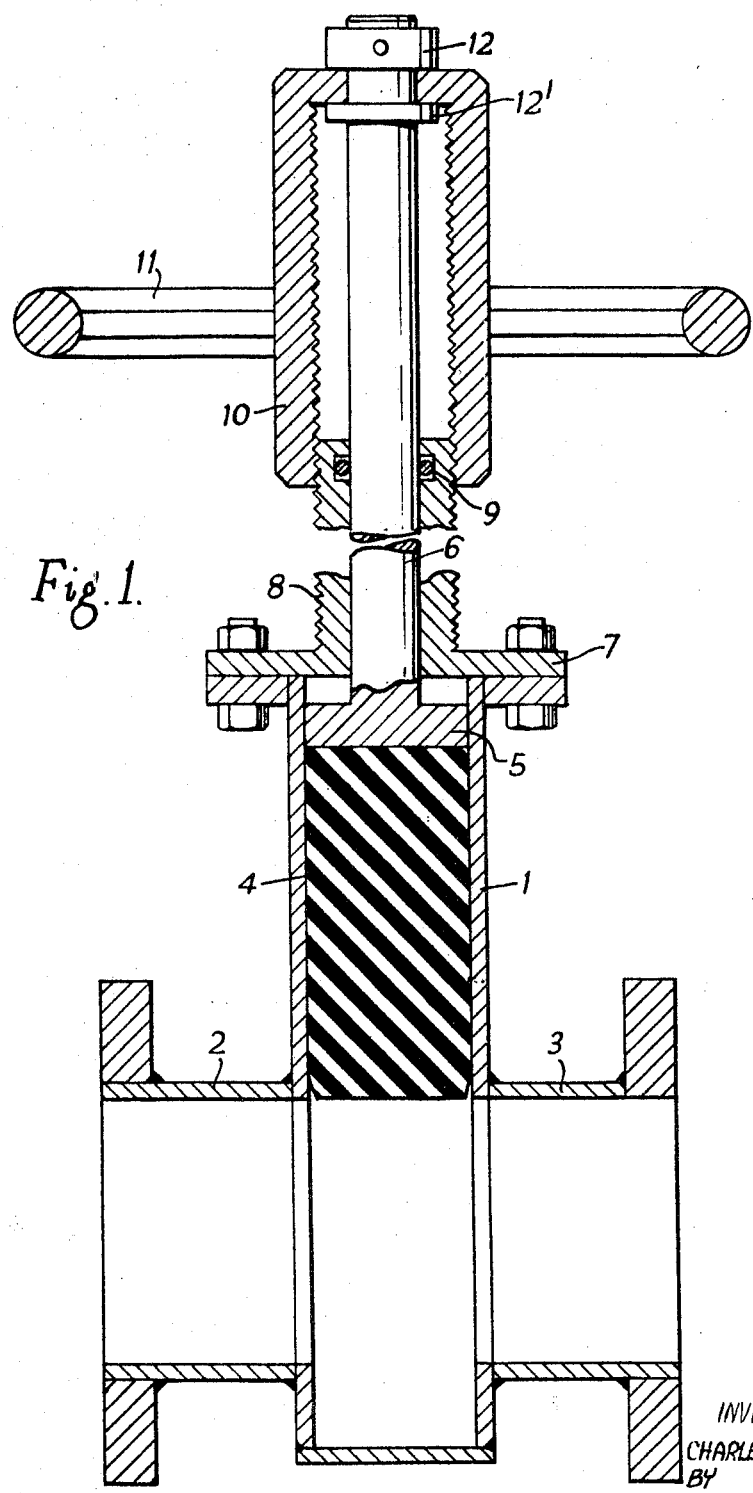

The present invention relates to sluice valves of the type comprising a pressure-tight chamber having inlet and outlet connections communicating with its interior through ports in opposite walls thereof, a gate arranged for sliding movement in the said chamber between a "closed position" in which it covers the said ports to shut off the flow of liquid or the like through the valve and an "open position" in which the said ports are uncovered to permit such flow of liquid or the like and operating means for moving the gate between said closed and open positions.

In sluice valves of this type, the operating means for moving the gate between the closed and open positions usually consists of a screwed spindle and handwheel, and the gate is usually a metallic gate which is arranged to be forced against a prepared seating on the mouth of the inlet port by means of wedge-shaped slide-ways, so that the further the slide is forced towards the closed position, the greater is the force with which it is pressed against the seating. In double gate valves, both sides of the gate are made to press against seatings communicating with the inlet and outlet ports. In other designs, two gates are used, back-to-back, with a wedge between them, forcing them against seatings on each side, on the mouths of the inlet and outlet ports respectively. In yet other designs of double gate sluice valves, two gates back-to-back are arranged to be forced against the seatings by an interposed spring.

In all these known sluice valves, a considerable proportion of the total manufacturing time is taken up in machining the seating surfaces on the gate and the mating surfaces in the body, in machining the wedge-shaped slides in the body and finally in hand-fitting all these surfaces in order to obtain a pressure-tight metal-to-metal seating. In mating the normal valve gate to the seating, considerable hand fitting is involved. Typical piece-work times for this work are:

| | Man hours |
|---|---|
| 2″ valve | 6 |
| 4″ valve | 10 |
| 6″ valve | 12 |

One object of the present invention is to eliminate this machining and hand-fitting work and consequently to cheapen the production of the valve.

Another object of the invention is to overcome the difficulty of maintaining a pressure-tight seal between the gate and its cooperating seating when the valve is in service. This applies particularly to valves used in the handling of sewage, pulps and slurries and, in general, of fluids containing bodies in suspension. The sharp and abrasive particles carried by fluids of this nature rapidly score the seating elements so that the valves do not retain their shut-off characteristics for any length of time in service.

According to the present invention, there is provided a sluice valve of the type described wherein the gate comprises a block of rubber movable into and out of a position in which it covers the ports and can be caused by the application of a compressive force to seal against at least one of the ports.

In the above paragraph and throughout this specification the term "rubber" is used to include rubber-like materials such as synthetic rubbers and elastomeric plastics.

With this arrangement, the block of rubber can be moved into the position in which it covers the ports and, in order to close the valve, slight further movement is imparted to the operating means so as to force the top of the rubber block slightly downwards. Since rubber is virtually incompressible the volume displaced by the slight further movement of the operating means causes a sideways expansion of the block of rubber which bulges out into the inlet and outlet ports, forming an effective pressure seal.

The operating means may be operatively connected to a metal sliding block which is either bonded to the upper end of the rubber block or detachably connected thereto by a dovetail connection.

The rubber block may be reinforced internally by a number of parallel rods or by a plate, the rods or plate being arranged so as to prevent doming of the rubber block due to pressure acting against it on its upstream side, while at the same time permitting the "bulging out" of the rubber block into the inlet and outlet ports.

Furthermore, the bottom of the well formed by the portion of the chamber below the level of the inlet and outlet connections may be provided with an outlet opening communicating through a duct with the outlet connection of the valve, whereby solids that would otherwise have collected in the well are free to escape. In cases where the wall is provided with such an outlet opening, the rubber block may, according to a modification forming part of this invention, be reinforced by a stiffening plate on its downstream side, the lower edge of this stiffening plate being located sufficiently above the bottom of the rubber block to allow for vertical compression of the latter, whereby the rubber block is caused to bulge out into the inlet port only.

Figure 2:
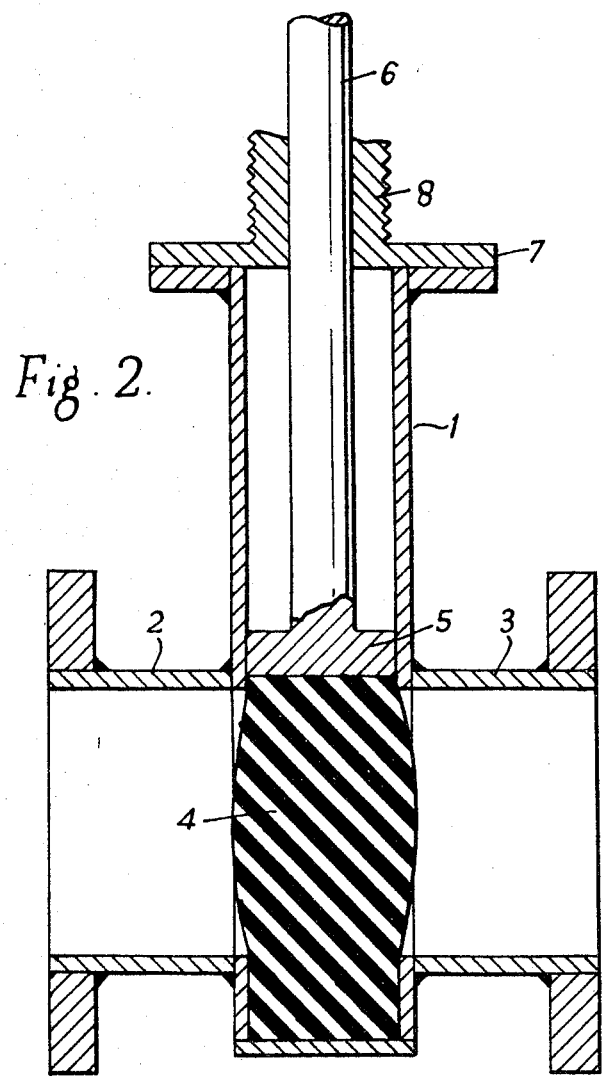
Figure 3:
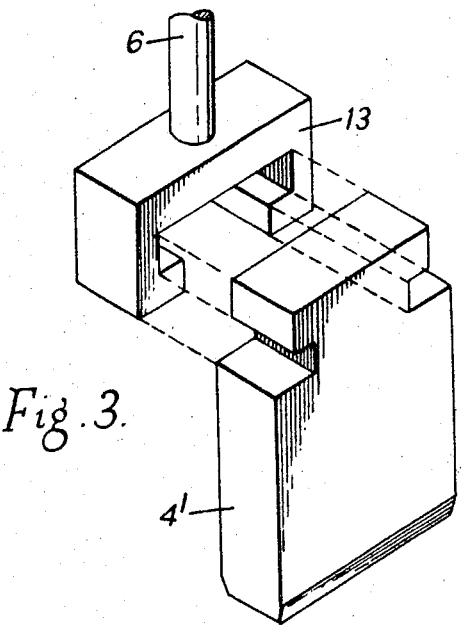
Figure 5:
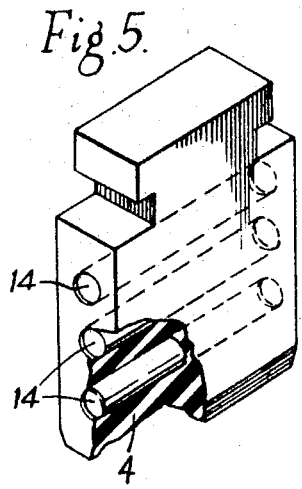
Figure 4:
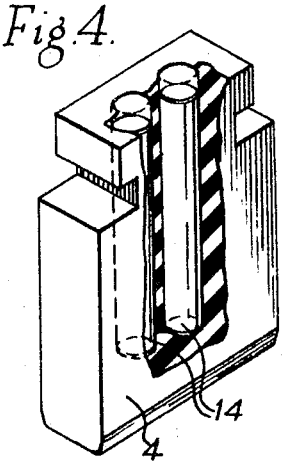
Figures 6, 7:
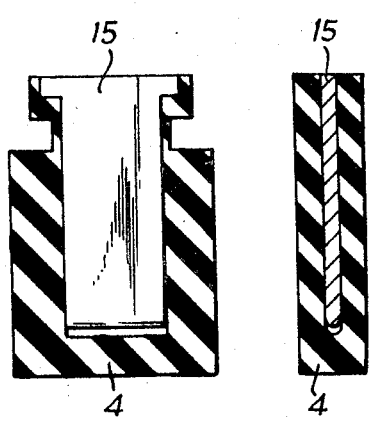
Figure 8:
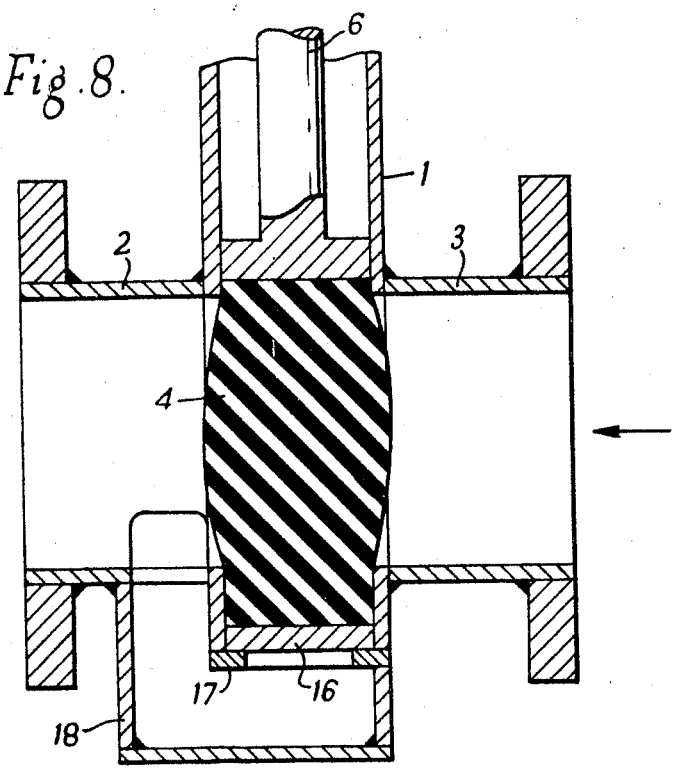
Figure 9:
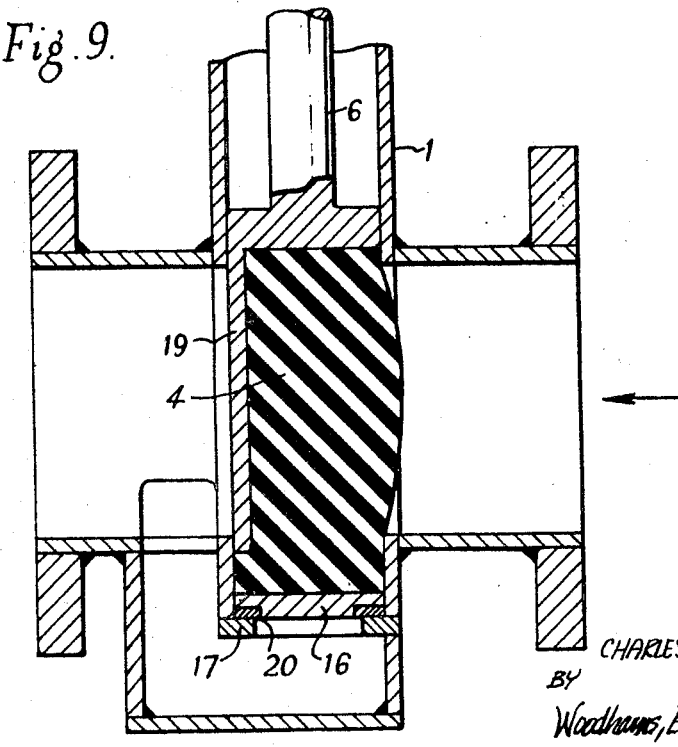

The invention will now be described by way of example with reference to the accompanying diagrammatic drawings, in which:

FIGURE 1 is a vertical section of a sluice valve according to one method of construction, in the open position, FIGURE 2 is a vertical section of the same sluice valve, in the closed position, FIGURE 3 is an exploded perspective view illustrating one method of attaching a rubber block to an operating spindle, FIGURES 4 and 5 are perspective views illustrating respectively two methods of reinforcing the rubber block internally by means of rods, FIGURES 6 and 7 are respectively vertical sections in planes parallel to and at right angles to the main opposite sides of a rectangular-section rubber block reinforced internally by means of a plate, FIGURES 8 and 9 are side elevations similar to, and illustrating modifications of the valve shown in FIGURE 1, FIGURES 10 and 11 are side and end elevations respectively of a sluice valve according to another method of construction and FIGURE 12 is a vertical section on the section XII—XII in FIGURE 10 showing this valve in the closed position.

The body of the sluice valve shown in FIGURE 1, which is fabricated by welding or brazing from rolled sheet metal, has a rectangular chamber 1, with inlet and outlet connections 2 and 3. It must be emphasised that, if the valve body is fabricated from rolled sheet metal, or precision cast, no machining is required, except for the facing and drilling of flanges. That is to say, provided that the cross-section of the rectangular chamber is reasonably constant over its vertical height, so that a rectangular rubber block can slide easily within it, no internal mechining of slide-ways is required.

A rectangular rubber or plastics block 4 is arranged to slide freely within the rectangular chamber 1 and is formed with a slight chamfer on its bottom edge. The block 4 is bonded to a metal sliding block 5, to which a valve spindle 6 is attached. A top cover 7, secured to the valve body by bolting, carries a screw-threaded extension 8 in which the spindle 6 is arranged to slide. Within the screw-threaded extension 8 there is situated a known type of spindle gland, shown in FIGURE 1 as an O-ring seal 9. An internally screw-threaded boss 10 carrying a handwheel 11 is arranged to travel vertically up and down the screw-threaded extension 8 on the cover 7, as the handwheel 11 is rotated. The top of the valve spindle 6 is fixed rotatably in the top of the boss 10, by two collars 12, 12'. Thus, by rotating the handwheel 11, the rubber block 4 can be traversed from the closed to the open position and vice versa, in the rectangular chamber 1.

No particular importance is attached to the actual form of the operating gear as this can be of any known type.

Referring to FIGURE 2 which shows the valve, excluding the operating gear, in the closed position, it will be seen that, by screwing down slightly further on the spindle 6 after the rubber block 4 has reached the bottom of its stroke, the rubber block has been caused to "bulge out" into the inlet and outlet ports so as to form pressure-tight seals. To avoid cutting the rubber block, it is necessary to remove the sharp edges at the intersections of the inlet and outlet ports with the rectangular chamber walls by filing or grinding.

FIGURE 3 shows an alternative method of attaching a rubber block 4 to the operating spindle 6, making use of a dovetail-slotted block 13, which replaces the block 5 in FIGURES 1 and 2 and is welded to the spindle 6. Moulded on the upper end of the rubber block 4' is a corresponding dovetailed portion which is engageable in the dovetail slot of the block 13 as a good push fit. The rubber block 4', which should be of the order of 75° to 90° Shore hardness, is sufficiently rigid to prevent distortion of its dovetailed portion when it is traversed upwards and downwards by the operating gear. Alternatively, the dovetailed portion of the rubber block may be strengthened by moulding-in metal support pieces (not shown).

The advantage of this dovetailed construction is that, if the rubber block 4' becomes sufficiently worn to require replacement, it is only necessary to slide it out of the dovetailed slot of the block 13 and insert a spare block. Thus, the virtual renewal of the valve is obtained as the result of a few minutes work in removing and replacing the valve cover and substituting a new rubber block for the worn one.

It will be appreciated that the advantage of the rubber block over a metal gate, from the sealing aspect, is that when gritty particles are trapped between the sealing elements, the rubber is capable of accepting them without the scoring which would occur with metal-to-metal sealing. If any pitting does occur, due to sharp particles cutting the surface of the rubber, the effect can be overcome by screwing more tightly down on the rubber block.

For the level of pressure usually encountered in sewage, slurry and pulp applications, which is generally below 50 lb./sq. in., the thickness of the rubber block is sufficient to provide adequate stiffness to withstand the bending effect exerted by the fluid on the upstream side. The general proportion which has been found by experiment to be satisfactory is that the thickness of the rubber should be about one quarter to one third of the bore of the valve, but this ratio should be regarded only as a general guide. For higher pressures, it is necessary to provide some reinforcement of the rubber block to prevent it from "doming" under pressure from the upstream side when the valve is shut.

One method of doing this is shown in FIGURES 4 and 5 in which a number of holes are moulded in the rubber block 4 in line with the spindle (FIGURE 4) or transversely (FIGURE 5), into which metal rods 14 are pushed as sliding fits. These holes, if in the vertical direction (FIGURE 4), do not extend to the bottom of the block and the rods 14 are then shorter than the length of the holes so that the rubber can be compressed vertically without any compression being transmitted to the rods 14. When the holes are moulded transversely (FIGURE 5), they may extend right through the block, the rods 14 in this case being fitted into the holes with their ends slightly set back from the corresponding edge surfaces of the rubber block. Either of the arrangements shown in FIGURES 4 and 5 allows the rubber block 4 to perform its sealing function by "bulging out" slightly into the inlet and outlet ports, but prevents it from "doming" bodily due to pressure on the upstream side.

Another method of reinforcing the rubber block for higher pressures is shown in FIGURE 5, in which a flat metal plate 15 is either bonded into the rubber block 4 or pushed into a slot moulded in the centre thereof.

It will be noticed from FIGURE 1 that there is necessarily a well at the bottom of the rectangular chamber 1 into which the bottom of the rubber block 4 fits when in the closed position, so that it may overlap the inlet and outlet ports. When the fluid being handled contains a high proportion of solids in suspension, this well may become choked with solids and thus prevent the rubber block from reaching the fully closed position. To prevent this happening, the construction shown in FIGURE 8 may be adopted. In this construction, a metal plate 16 is bonded to the bottom of the rubber block 4. Most of the centre of the bottom of the well is cut away, leaving a ledge 17 all round, on which the metal plate 16 presses when the block 4 is in the lowest position. Below the cut-away portion of the bottom of the well, there is attached a casing part 18 enclosing a passage which communicates with the downstream side of the valve. When the rubber block 4 reaches the bottom position as shown in FIGURE 8, the additional downward force exerted by the spindle 6 causes the rubber block 4 to be compressed against the metal bottom plate 16, which itself is prevented from downward movement by the ledges 17, thus causing the rubber block 4 to "bulge out" into the inlet and outlet ports as before.

It will be appreciated that the passage 18 by-passes one of the rubber-to-metal seals between the upstream side of the valve and the downstream side. The seal which is by-passed is of course that on the downstream side. This being the case, the efficiency of the sealing of the valve is not appreciably impaired by eliminating the rubber-to-metal seal on the downstream side. The stiffening plate shown in FIGURES 6 and 7 can therefore be transferred to the downstream side of the rubber block 4, in the manner shown in FIGURE 9. This enables the stiffening plate 19 to be made integral with the top metal block which is attached to the operating spindle 6. A gap must be left between the bottom of the plate 19 and the bottom plate 16 to allow for the vertical compression of the rubber block.

If desired, a thin rubber packing 20 can be bonded or otherwise attached to the bottom plate 16 in the manner shown in FIGURE 9. The presence of the packing 20 enables a pressure-tight seal to be made between the bottom plate 16 and the ledge 17.

FIGURES 10 to 12 illustrate an alternative construction of sluice valve intended primarily for use in small-bore pipe lines, i.e., pipe lines having a bore of the order of ½ inch and at working pressures of up to 150 p.s.i. The body of this valve has a cylindrical chamber 21 with inlet and outlet connections 22 and 23 which communicate with the lower part of the cylindrical chamber 21 through ports 22' and 23' formed respectively in diametrically opposite sides of the chamber wall.

A cylindrical rubber or plastics block 24 is arranged to slide freely within the cylindrical chamber 21. The block 24 is bonded to a metal sliding block 25 to which the lower end of a valve spindle 26 is attached by a connection which permits rotation, but not axial displacement, of the spindle 26 relatively to the sliding block 25. A circumferential groove in the sliding block 25 accommodates on O-ring 27 which seals the working clearance between the said block 25 and the wall of the chamber 21. Screwed over the upper end of the chamber 21 is a cover 28. The valve spindle 26 is externally screw-threaded for engagement in a screw-threaded bore in the top wall of the cover 28. On the upper end of the spindle there is secured by a dowel pin 29 an operating member in the form of a flanged disc 30 having a knurled periphery.

By turning the operating member 30, the rubber block 24 can be traversed from the closed position to the open position and vice versa, in the cylindrical chamber 21.

As can be seen from FIGURE 12, the lower end part of the chamber 21 below the lower edges of the ports 22' and 23' forms a well into which the lower end part of the rubber block 24 fits when in the closed position, so that parts of the outer surface of the rubber block overlap the margins of the ports around their entire circumferences.

The valve body, comprising the chamber 21 and inlet and outlet connections 22, 23, and the cover 28 may be made of gunmetal. The plug 24 and the O-ring 27 may be made of nitrile rubber of 65° to 77°.

I claim:
1. A sluice valve comprising:
a pressure-tight chamber;
an inlet connection communicating with the interior of the chamber through a port in one wall of the chamber;
an outlet connection communicating with the interior of the chamber through another port in an opposite wall of the chamber;
a gate comprising a block of rubber;
means for moving the gate into and out of a position in which it covers the ports and for applying a compressive force to it when it is in the said position to cause it to seal against at least one of the ports; and
a plurality of parallel reinforcement rods located in the rubber block.

2. A sluice valve comprising:
a pressure-tight chamber;
an inlet connection communicating with the interior of the chamber to a port in one wall of the chamber;
an outlet connection communicating with the interior of the chamber through another port in an opposite wall of the chamber;
a duct connecting the pressure-tight chamber below the level of the inlet and outlet connections with the said outlet connection;
a gate comprising a block of rubber;
a plurality of parallel reinforcing rods located in the block of rubber; and
means for moving the gate into and out of a position in which it covers the ports and for applying a compressive force to it when it is in the said position to cause it to seal against at least one of the ports.

3. A sluice valve comprising:
a pressure-tight chamber;
an inlet connection communicating with the interior of the chamber through a port in one wall of the chamber;
an outlet connection communicating with the interior of the chamber through another port in an opposite wall of the chamber;
a gate comprising a block of rubber;
means for moving the gate into and out of a position in which it covers the ports and for applying a compressive force to it when it is in the said position to cause it to seal against at least one of the ports;
a duct connecting the pressure-tight chamber below the level of the inlet and outlet connections with the said outlet connections; and
a stiffening plate mounted on the downstream side of the rubber block to reinforce the rubber block.

References Cited

UNITED STATES PATENTS

| 2,290,251 | 7/1942 | Saunders | 251—167 |
| 2,911,188 | 11/1959 | Anderson | 251—327 |
| 3,260,498 | 7/1966 | Johnson | 251—191 X |

FOREIGN PATENTS

| 520,456 | 1/1956 | Canada. |
| 1,133,195 | 7/1962 | Germany. |
| 19,005 | 1896 | Great Britain. |
| 907,319 | 10/1962 | Great Britain. |

ARNOLD ROSENTHAL, Primary Examiner

U.S. Cl. X.R.
251—191, 195, 327